United States Patent
Haeussner et al.

(10) Patent No.: US 12,082,595 B2
(45) Date of Patent: Sep. 10, 2024

(54) RUMEN PROTECTED PRODUCTS

(71) Applicant: Evonik Operations GmbH, Essen (DE)

(72) Inventors: Thomas Haeussner, Eppertshausen (DE); Georg Borchers, Bad Nauheim (DE); Harald Jakob, Hasselroth (DE); Ulrike Kottke, Linsengericht-Grossenhausen (DE); Frank Fischer, Hofheim (DE); Claudia Parys, Lahnau (DE); Winfried Heimbeck, Moembris (DE); Christian Rabe, Grossostheim (DE); Karsten Portner, Frankfurt (DE)

(73) Assignee: Evonik Operations GmbH, Essen (DE)

( * ) Notice: Subject to any disclaimer, the term of this patent is extended or adjusted under 35 U.S.C. 154(b) by 550 days.

(21) Appl. No.: 16/650,974

(22) PCT Filed: Sep. 27, 2018

(86) PCT No.: PCT/EP2018/076220
§ 371 (c)(1),
(2) Date: Mar. 26, 2020

(87) PCT Pub. No.: WO2019/063669
PCT Pub. Date: Apr. 4, 2019

(65) Prior Publication Data
US 2020/0253242 A1 Aug. 13, 2020

(30) Foreign Application Priority Data
Sep. 28, 2017 (EP) .................. 17193739

(51) Int. Cl.
| | | |
|---|---|---|
| *A23K 20/158* | (2016.01) | |
| *A23K 10/18* | (2016.01) | |
| *A23K 20/147* | (2016.01) | |
| *A23K 20/163* | (2016.01) | |
| *A23K 20/174* | (2016.01) | |
| *A23K 40/35* | (2016.01) | |
| *A23K 50/10* | (2016.01) | |

(52) U.S. Cl.
CPC ............ *A23K 10/18* (2016.05); *A23K 20/147* (2016.05); *A23K 20/158* (2016.05); *A23K 20/163* (2016.05); *A23K 20/174* (2016.05); *A23K 40/35* (2016.05); *A23K 50/10* (2016.05)

(58) Field of Classification Search
None
See application file for complete search history.

(56) References Cited

U.S. PATENT DOCUMENTS

| | | |
|---|---|---|
| 3,655,864 A | 4/1972 | Grass et al. |
| 2007/0148212 A1 | 6/2007 | Okutani et al. |
| 2010/0272852 A1 | 10/2010 | Wright et al. |
| 2011/0250286 A1 | 10/2011 | Marcello et al. |
| 2012/0090367 A1 | 4/2012 | Wright et al. |
| 2012/0244248 A1 | 9/2012 | Wright et al. |
| 2015/0157577 A1 | 6/2015 | Smith et al. |
| 2016/0037805 A1 | 2/2016 | Wright et al. |
| 2016/0228391 A1 | 8/2016 | Smith et al. |
| 2017/0216208 A1 | 8/2017 | Smith et al. |

FOREIGN PATENT DOCUMENTS

| | | |
|---|---|---|
| JP | 5-192096 A | 8/1993 |
| WO | WO 2018/154532 A1 | 8/2018 |

OTHER PUBLICATIONS

International Search Report and Written Opinion issued Dec. 3, 2018 in PCT/EP2018/076220 filed on Sep. 27, 2018.
International Preliminary Report on Patentability issued Jan. 9, 2020 in PCT/EP2018/076220 filed on Sep. 27, 2018.

*Primary Examiner* — Michelle F. Paguio Frising
(74) *Attorney, Agent, or Firm* — Oblon, McClelland, Maier & Neustadt, L.L.P.

(57) ABSTRACT

A composition for feeding a ruminant, including i) a core including a biologically active ingredient selected from i) amino acids, ii) proteins, iii) peptides, iv) carbohydrates, v) vitamins, vi) probiotic microorganisms, vii) prebiotic foods, viii) choline and salts, and ix) polyunsaturated fatty acids (PUFAs); and ii) a coating surrounding said core. The coating includes one or more layers of a mixture including from 60 wt %+/−10% to 80 wt %+/−10% of a saturated fat and from 20 wt %+/−10% to 40 wt %+/−10% of a fatty acid, each based on the total weight of the coating. The composition includes from 5 wt %+/−10% to 30 wt %+/−10% of the coating, based on the total weight of the composition.

12 Claims, No Drawings

RUMEN PROTECTED PRODUCTS

The present invention relates to a composition for feeding a ruminant comprising a biologically active ingredient and a coating surrounding the biologically active ingredient, a process for its preparation, a feed comprising the composition according to the present invention and a method of supplementing the diet of a ruminant with a biologically active ingredient with the composition or the mixed feed according to the present invention.

Ruminant animals are mammals of the suborder Ruminantia including the well-known cattle, sheep, and goats. They have a stomach divided into four morphologically distinct compartments: the rumen, the reticulum, the omasum, and the abomasum. The rumen and the reticulum are derived from the terminal portion of the esophagus, and the omasum and abomasum are considered to be a genuine stomach. Bacteria present in the rumen enable ruminants to digest cellulosic materials such as grass. Conventional digestion occurs in the abomasum, sometimes called the true stomach.

The rumen, which is essentially a continuous fermenter, supports a variety of microorganisms, which attack and digest much of the ingested feedstuffs consumed by a ruminant as part of their normal life cycle. Ingested protein material is broken down in the rumen to soluble peptides and amino acids that are used as nutrients by the microorganisms. A stream of ingesta, rich in microbial cells, passes out of the rumen into the omasum. The function of the omasum is to separate liquids and solids. Much of the liquid reenters the rumen while the remainder of the material enters the abomasum. Digestion and absorption then proceed in the abomasum in a manner similar to that found in monogastrics. Enzymes secreted into the lumen of the abomasum digest much of the material, including the microbial cells. The digested microbial cells provide protein and amino acids to the ruminant.

The microbial action of the rumen has the great advantage of being able to convert many feed components, which have no direct nutritive value for the host into products, which can be assimilated and utilized by the host. For example, cellulose may be converted to a mixture of volatile fatty acids, which can serve as a source of energy to the host.

Unfortunately, this microbial action also presents certain disadvantages. For instance, soluble proteins of high nutritive value may be broken down and digested in the rumen and in part resynthesized into microbial protein of lower nutritive value. Amino acids are also chemically changed by the rumen microorganisms, which convert amino acids to carbon dioxide, volatile fatty acids, and ammonia.

All proteins present in animals are constituted by combinations of more than 20 different amino acids. Among these, ten essential amino acids are not adequately synthesized in the animal body, and the animal must take them in. These ten amino acids are also referred to as essential or growth limiting amino acids. When essential amino acids are lacking in the ruminant diet the ruminant's health, milk production, etc., are all negatively affected.

It is therefore common practice in ruminant production to supply biologically active ingredients in the daily diet of the animals in order to improve their conditions of health and their productive performance. Active ingredients of interest include amino acids, vitamins, enzymes, nutrients such as protein and carbohydrates, probiotic microorganisms, prebiotic foods, mineral salts, choline, guanidino acetic acid, etc. Some of these ingredients are already present in foods used for feeding animals. Sometimes the amount of essential active ingredients present in the diet may be insufficient or inadequate to cope with states of deficiency or situations of high productivity. Therefore, it is desirable to carefully formulate or supplement the daily diet of ruminant animals in order to address these concerns.

However, when physiologically active ingredients such as amino acids and proteins are orally fed, a substantial part of the ingredient, e.g. proteins and amino acids, are decomposed by microorganisms in the rumen. This makes it difficult or even impossible for the animal to effectively utilize all or relevant amounts of the administered proteins and amino acids contained in the feed, etc. Accordingly, essential amino acids are destroyed or converted and thus rendered unavailable for the growth of animals and animal production in general. However, animal production is limited by the supply of individual amino acids that should escape or bypass the rumen intact and reach the lower gastrointestinal tract of the animal, where they can be absorbed and become available for animal production. Accordingly, it is important to pass the biologically active ingredients through the rumen without decomposition by microorganisms to allow the biologically active ingredients to be effectively digested and absorbed in the abomasum and subsequent digestive tract.

Numerous methodologies were designed to increase the amount of a nutrient that passes through the rumen without being degraded by the rumen microflora, thereby delivering a larger portion of that nutrient to the lower gastrointestinal tract, including: heat and chemical treatment, encapsulation and coating, use of amino acid analogs, and polymeric compounds of amino acids.

For example the U.S. Pat. No. 3,541,204 discloses hydrogenated vegetable and animal fats and waxes as coatings for biologically active substances. The U.S. Pat. Nos. 5,496,571 and 5,807,594 each disclose a method of encapsulating choline to produce a rumen bypass supplement for ruminants. In the method of these patents the choline particles are surrounded by a shell of fat. Further, the U.S. Pat. No. 6,022,566 also discloses the preparation of an encapsulated choline chlorine by adding fat to a feed ration and then adding rumen protected encapsulated choline chloride in an amount proportional to the added fat. However, particles which were coated with fats and oils only, are stable not only in the rumen, but also in the abomasum and subsequent digestive tract, making the biologically active substances difficult to be released in the abomasum and subsequent digestive tract.

U.S. Pat. No. 3,655,864 discloses biologically active feed additives for ruminants having a coating mixture of glyceryl tristearate with a liquid unsaturated fatty acid, which is resistant to the rumen contents but capable of permitting absorption from the lower digestive tract postruminally. Specifically, this document discloses feed additives with a rather high content of the coating of ca. 80 wt.-%, based on the total weight of the feed additive. It is therefore disadvantage of the feed additives of U.S. Pat. No. 3,655,864, that the amount of the biologically active compound, which is postruminally absorbed in the lower digestive tract, is rather low.

Further, the U.S. Pat. No. 4,808,412 discloses a rumen stable composition containing an active agent molecularly dissolved with a basic polymer. The active agent is delivered post-ruminally because the polymer is resistant to a pH of higher than about 5, but is soluble or swellable at a pH of less than about 3.5. However, this type of dispersion has defect such as cracks and channels so that the active agent is not effectively protected from degradation by the action of ruminal microbes.

Published patent application U.S. 2007/0148212 A1 discloses a feed additive composition for ruminants, in which a biologically active substance is coated with a coating composition, which enables the substance to be stably protected within the rumen, and to be released in the abomasum and/or the subsequent digestive tract. However, the products of U.S. 2007/0148212 A1 contain only a low amount of the biologically active substance and a large amount of the coating material. As a consequence, the amount of biologically active substance, which is released from the products of U.S. 2007/0148212 A1 in the lower digestive tract and absorbed there, still leaves room for improvement.

Published patent application U.S. 2012/0093974 A1 discloses a ruminant feed composition comprising an active substance and a coating material surrounding said active substance, wherein said coating material is a hydrogenated vegetable oil with 5 to 10 wt.-% of a supplemental fatty acid, based on the total weight of the coating. However, the tests for determining the rumen bypass route and the intestinal digestibility cannot prove that the coating material of this document indeed provide the active substance with the required stability in the rumen and the required digestibility in the gastrointestinal tract. The reason for this is that the rumen bypass protocol of U.S. 2012/0093974 A1 was performed with bags, which were completely or almost completely filled with the test product particles. As a consequence, the tested product particles were tightly packed in the bags so that only the outer test products at the periphery of the bags were subjected to degradation while the inner test products were not in direct contact with the rumen liquid. In contrast the intestinal digestibility protocol was performed with bags which contained only 4% of the weight of the test product particles of the rumen bypass protocol. However, this rather loose packing favors the release of active substances from the test product particles. Accordingly, the rumen bypass route and the intestinal digestibility of a product of the U.S. 2012/0093974 A1 were each determined under completely conditions and thus the respective results are not suitable to describe one and the same product. Rather, the large difference between the rumen bypass protocol and the intestinal digestibility protocol only allows the conclusion that the products according to the technical teaching of U.S. 2012/0093974 A1 do not give the desired digestibility for the active ingredients and thus do not allow to provide the ruminant with the desired amount of metabolizable biologically active ingredient.

Published patent application U.S. 2017/0216208 A1 discloses compositions for ruminants with a core comprising the biologically active compound and a layer coated on the core. The compositions can comprise two layers, wherein the first layer comprises a polymer, e.g. ethyl cellulose (EC), and an optional oligomer, e.g. an oligomer based on 2-hydroxy-4-methylthiobutanoic acid, and the second layer around the first layer comprises a hydrophobic material comprising for example a hardened soybean oil and stearic acid. However, the release rates for the biologically active compound from the compounds in the rumen and in the lower digestive tract still leave room for improvement.

The term metabolizable amount of biologically active ingredient M(BAI) is used in the context of the present invention to denote the fraction of biologically active ingredient in grams per kg that has been released post-ruminally from the tested composition in the abomasum and small intestine of the ruminant and thus can be metabolized or utilized by the animal. Accordingly, the term metabolizable amount of biologically active ingredient is the fraction of biologically active ingredient in grams per kg that has been released post-ruminally from the tested composition and is subject to metabolization.

Accordingly, there is still a need for a composition for feeding a ruminant which allows to provide the ruminant with a metabolisable amount of a biologically active ingredient as high as possible.

It was found that this problem is solved by coating a biologically active ingredient with a specific coating material comprising from 60 wt.-%+/−10% to 80 wt.-%+/−10% of a saturated fat, e.g. a hydrogenated fat, and from 20 wt.-%+/−10% to 40 wt.-%+/−10% of a fatty acid, each based on the total weight of the coating, and the thus obtained composition comprises from 5 wt.-%+/−10% to 30 wt.-%+/−10% of the coating, based on the total weight of the composition.

The coating according to the present invention does not only allow to yield high rumen protected fractions but also allows to yield a high digestibility. Thus, in combination the coating according to the present invention allows to yield high metabolizable amounts of the biologically active ingredient.

One object of the present invention is therefore a composition for feeding a ruminant comprising
a) a core comprising or consisting of a biologically active ingredient selected from the list consisting of i) amino acids, derivatives of amino acids, and/or salts of amino acids and/or of their derivatives, ii) proteins, iii) peptides, iv) carbohydrates, v) vitamins, and ingredients having similar functions, vi) probiotic microorganisms, vii) prebiotic foods, viii) choline and salts and/or derivatives thereof, and ix) polyunsaturated fatty acids (PUFAs), and salts and/or derivatives thereof, and
b) a coating surrounding said core, wherein said coating comprises one or more layers of a mixture comprising a saturated fat, e.g. a hydrogenated fat, and a fatty acid, and said coating comprises from 60 wt.-%+/−10% to 80 wt.-%+/−10% of the saturated fat, e.g. hydrogenated fat, and from 20 wt.-%+/−10% to 40 wt.-%+/−10% of the fatty acid, each based on the total weight of the coating, wherein the composition comprises from 5 wt.-%+/−10% to 30 wt.-%+/−10% of the coating, based on the total weight of the composition.

In context of the present invention the term fat is used to denote the esters formed of fatty acids with the alcohol glycerol, which are also known as glycerides. Typically, fats are triglycerides, i.e. esters formed of three fatty acids with glycerol, wherein all three alcohol groups of glycerol are esterified. In the context of the present invention the term fat and in particular the terms saturated fat, hydrogenated fat, saturated vegetable oil, and hydrogenated vegetable oil also comprises monoglycerides and/or diglycerides, where only one or two of the alcohol groups of glycerol are esterified. Regarding its composition the term fat is used in the context of the present invention as known to the person skilled in the art and, therefore, denotes a commercially available fat containing in any case less than 5%, preferably not more than 3%, of free fatty acids, i.e. fatty acids which are not part of the ester (in this context reference is made to Fats and Fatty Oils, Chapter 6.2 Deacidification, page 32, in Ullmann's Encyclopedia of Industrial Chemistry, Wiley-VCH Verlag GmbH & Co. KGaA, Weinheim, 2015).

In context of the present invention the term saturated fat, e.g. hydrogenated fat, is used to denote a fat in which the fatty acid chains have predominantly single bonds. The term saturated fat also includes hydrogenated fats, in which all or most of the double bonds which were or may have been formerly present in the fat were reacted with hydrogen to form single bonds. They are called hydrogenated, because the second bond is broken up and each half of the bond is attached to (saturated with) a hydrogen atom. Most animal fats are saturated fats. The fats of plants and fish are generally unsaturated. Such unsaturated fats may be partially or completely hydrogenated to convert them into hydrogenated fats, which in the present invention are also considered saturated fats. Hydrogenated vegetable oil typically contains triglycerides of a mixture of saturated fatty acids with different chain lengths. In addition, the hydrogenated vegetable oil can also contain monoglycerides or diglycerides. Further, the term saturated fat also includes those saturated fats which are obtained by fractionated distillation of a mixture of different fats, e.g. mixture of unsaturated and saturated fats.

In context of the present invention the term fatty acid is used as known to the person skilled in the art and denotes a carboxylic acid with a long $C_4$ to $C_{28}$ aliphatic chain, which is either saturated or unsaturated. Said fatty acid may be branched or unbranched, but preferably it is unbranched.

In context of the present invention the term +/−10% with respect to an indication of weight or weight percentage or wt.-% is used to encompass all weight values from 10% below the explicitly mentioned values to 10% above the explicitly mentioned value, wherein said indicated values of weight include all values which can be expressed by integral and real numbers. For example, the term 60 wt.-%+/−10% includes all integral values and real number values from 54 wt.-% to 66 wt.-%, in particular 54, 55, 56, 57, 58, 59, 60, 61, 62, 63, 64, 65, and 66 wt.-% and the term 40 wt.-%+/−10% includes all integral values and real number values from 36 wt.-% to 44 wt.-%, in particular, 36, 37, 38, 39, 40, 41, 42, 43 and 44 wt.-%. For example, the term 80 wt.-%+/−10% comprises all integral values and real number values from 72 wt.-% to 88 wt.-%, in particular 72, 73, 74, 75, 76, 77, 78, 79, 80, 81, 82, 83, 84, 85, 86, 87, and 88 wt.-%, and the term 20 wt.-%+/−10% includes all integral values and real number values from 18 wt.-% to 22 wt.-%, in particular 18, 19, 20, 21 and 22 wt.-%. For example, the term 75 wt.-%+/−10% includes all integral values and real number values from 67.5 wt.-% to 82.5 wt.-%, in particular 68, 69, 70, 71, 72, 73, 74, 75, 76, 77, 78, 79, 80, 81, and 77 wt.-%, and the term 25 wt.-%+/−10% includes all integral values and real number values from 22.5 to 27.5 wt.-%, in particular 23, 24, 25, 26, and 27 wt.-%. For example, the term 70 wt.-%+/−10% includes all integral value and real number values from 63 wt.-% to 77 wt.-%, in particular 63, 64, 65, 66, 67, 68, 69, 70, 71, 72, 73, 74, 75, 76, and 77 wt.-%, and the term 30 wt.-%+/−10% includes all integral value and real number values from 27 wt.-% to 33 wt.-%, in particular 27, 28, 29, 30, 31, 32, and 33 wt.-%. Any indications of weight or weight percent also indicate that (slight) deviations from the mentioned or encompassed values, which however, still lead to essentially the same effect as the present invention, are also encompassed by the present invention. This is particularly relevant with respect to hydrogenated fat in general because the fat from which the hydrogenated fat is obtained is a natural product with varying quality and composition, irrespective of whether it is an animal fat or a vegetable oil, a natural, synthetic or fractionated animal or vegetable oil.

In principle, the present invention is not subject to any limitations regarding the number of saturated fats comprised by the coating according to the present invention. Therefore, said coating can comprise one or more saturate fats. Analog, the present invention is also not subject to any limitations regarding the number of fatty acids comprised by the coating according to the present invention. Therefore, said coating can comprise one or more fatty acids.

In context of the present invention the term biologically active ingredient is used to denote any compound which has a functional or nutritive activity to a biological system, such as the organism of an animal, in particular of a ruminant, e.g. cattle, sheep or goat. Typically, a biologically active ingredient exhibits low stability and thus a reduced or even lost bio-effectiveness when exposed to unfavorable conditions, for example moisture, elevated temperature, oxygen and acidic and/or basic pH. When the biologically active ingredient is exposed to such conditions, it can for example decompose, dissociate, deactivate, and/or lose viability. The term biologically active ingredient therefore refers to, for example, i) amino acids, such as lysine, methionine, tryptophan, arginine, histidine, isoleucine, leucine, phenylalanine, valine, and threonine, derivatives of amino acids, such as N-acylamino acids, e.g. N-acylmethionine, and N-guanylamino acids, e.g. N-guanylglycin also known as guinidinoacetic acid, and/or salts of amino acids, such as lysine sulfate, lysine hydrochloride, and the salts of lysine with polyunsaturated fatty acids, and/or of their derivatives, such as 2-hydroxy-4-(methylthio)butyric acid calcium salt, also known as the calcium salt of methionine hydroxy analogue (calcium MHA), ii) proteins, such as casein, corn proteins, and potato proteins, iii) peptides, such as oligopolypeptides, e.g. methionylmethionin (met-met) and/or polypeptides, iv) carbohydrates, such as starch, cane sugar, and glucose, v) vitamins, and ingredients having similar functions, such as vitamin A, vitamin A acetate, vitamin A palmitate, vitamin B, thiamine, thiamine hydrochloride, riboflavin, nicotinic acid, nicotinic acid amide, calcium pantothenate, choline pantothenate, pyridoxine hydrochloride, cholin chloride, cyanocobalamine, biotin, folic acid, p-aminobenzoic acid, vitamin D2, vitamin D3, and vitamin E, vi) probiotic microorganisms, vii) prebiotic foods, viii) choline and salts and/or derivatives thereof, and ix) polyunsaturated fatty acids (PUFAs), such as omega-3 fatty acids, e.g. alpha-linolenic acid (ALA), eicosapentanoic acid (EPA), and docosahexanoic acid (DHA) and salts and/or derivatives thereof.

Preferably, the biologically active ingredient of the composition according to the present invention is an amino acid, such as lysine, methionine, tryptophan, arginine, histidine, isoleucine, leucine, phenylalanine, valine, and threonine, derivative of amino acid, such as an N-acylamino acid, e.g. N-acylmethionine, and an N-guanylamino acid, e.g. N-guanylglycin also known as guinidinoacetic acid, and/or a salt of an amino acid, such as lysine sulfate, lysine hydrochloride, and the salts of lysine with polyunsaturated fatty acids, and/or of derivative thereof, such as 2-hydroxy-4-(methylthio)butyric acid calcium salt, also known as the calcium salt of methionine hydroxy analogue (calcium MHA) or a peptide, such as an oligopolypeptide, e.g. methionylmethionin (met-met) and/or polypeptides. In particular, the biologically active ingredient of the composition according to the present invention is lysine, methionine, guinidinoacetic acid, methionylmethionin (met-met), a derivative and/or salt thereof.

The composition according to the present invention and in particular its specific coating provide for a high rumen protection fraction and a high digestibility of the biologically active ingredient. As a consequence the composition according to the present invention allows to supply the ruminant with a higher amount of metabolizable biologically active ingredient than the products of the prior art. Specifically, a composition according to the present invention which comprises from 60 wt.-%+/−10% to 80 wt.-%+/−10% of a hydrogenated fat and from 20 wt.-%+/−10% to 40 wt.-%+/−10% of a fatty acid allows to supply the ruminant with a metabolizable amount of lysine of up to 400 g/kg, based on the pure substance lysine. By comparison, the products according to the technical teaching of US 2012/0093974 A1 supply the ruminant with a metabolizable amount of lysine from 300 g/kg to 320 g/kg at the most, based on the pure substance lysine. Accordingly, the compositions according to the present invention allow to provide the ruminant with an amount of metabolizable lysine which is at least 25% higher than the products of US 2012/0093974 A1.

In the context of the present invention the term rumen protected product or rumen protected composition is used to denote the fraction of the biologically active ingredient that is protected from degradation in the rumen, e.g. by ruminal microbes. Since fat is not degraded in the rumen, it is considered that the so-called McDougall is a suitable method for determining the said fraction.

The McDougall method is a 3-step in vitro test, which simulates the release rates of biologically active ingredients in the three different compartments of the ruminal digestive tract: rumen, abomasum and small intestine. For this purpose, the tests are performed in a three-step incubation procedure: In the first step the conditions in the rumen, which are temperature and pH, are simulated by use of the McDougall's buffer, in the second step the conditions in the abomasum are simulated by use of hydrochloric acid and pepsin, and in the third step the conditions of the small intestine are simulated by use of pancreatin and a suitable buffer to adjust a pH of 8. In contrast to the compartments of a ruminant containing microbial strains, which continuously produce fresh enzymes, the media in each of the three steps of the in vitro tests do not contain any microbial strain but only the specifically mentioned enzymes in the initially added amounts. The in vitro tests can be performed according to the following procedure, wherein different amounts of the ingredients as those explicitly mentioned may be used, provided that the respective ratios are still the same:

For the preparation of the McDougall's buffer the following substances are weighed into a 10 liters bottle:

| | | |
|---|---|---|
| $NaHCO_3$ | 98 g | (1.17 mol) |
| $Na_2HPO_4 \cdot 2\,H_2O$ | 46.3 g | (0.26 mol) |
| NaCl | 4.7 g | (0.08 mol) |
| KCl | 5.7 g | (0.08 mol) |
| $CaCl_2 \cdot 2\,H_2O$ | 0.4 g | (2.7 mmol) |
| $MgCl_2 \cdot 6\,H_2O$ | 0.6 g | (3.0 mmol) |

250 mL of the McDougall's buffer solution are filled into a 1000 mL Schott flask. 5 grams of the test substance, i.e. a composition according to the present invention with a specific biologically active ingredient, are added and the flasks are shaken at 100 rotations per minute in a lab shaker (Innova 40, New Brunswick Scientific) at 39° C. After 6 hours, the flask content is filtered off carefully, washed with 50 mL of cold water and directly transferred to the second flask containing 250 mL concentrated hydrochloric acid with pH 2 that contains a small amount of pepsin. After 2 hours incubation time at 39° C. the product is again filtered off carefully, washed with 50 mL of ambient water, and subsequently transferred to a third flask containing freshly prepared solution containing 14.4 mg tri(hydroxymethyl)aminomethane, 56.2 mg NaCl, 231 mg phosphatidylcholin, 60 mg Triton-X-100, 240 mg Na taurocholate, 300 mg $CaCl_2 \times 2H_2O$, and 120 mg pancreatin (≥8 USP lipase units/mg). After shaking for 24 hours the product is filtered off, washed again with cold water, and dried at 40° C. overnight. The residual product is weighted after each of the steps 1 and 3 and the weight loss is considered to be loss in biologically active ingredient. Alternatively or in addition, it is also possible to determine the loss in biologically active ingredient via photometric methods, e.g. UV/Vis, high pressure liquid chromatography (HPLC) or titration methods.

The calculation of the ruminal release fraction of the biologically active ingredient (BAI) is done with the following formula:

Ruminal BAI release fraction [%]=((initial amount of BAI [g]−residual amount of BAI after $1^{st}$ step of McDougall method [g])/(initial amount of BAI [g]))×100%.

Example: initial amount of BAI=5.0 g
residual amount of BAI after $1^{st}$ step=4.2 g Ruminal BAI release fraction [%]=((5.0 g−4.2 g)/(5.0 g))×100%=16%

The rumen protected (RP) fraction of the biologically active ingredient RP(BAI) is obtained using the following formula:

RP(BAI)[%]=100%−ruminal BAI release fraction [%]

Example: ruminal BAI release fraction=16%

RP(BAI)[%]=100%−16%=84%

In the context of the present invention the term digestibility is used to denote the fraction of the biologically active ingredient that is post-ruminally released and thus subjected to degradation in the abomasum and small intestine. It can be easily calculated as the difference between the complete amount of the biologically active ingredient and the fraction of the biologically active ingredient, which has not been degraded, e.g. in the McDougall method.

In the context of the present invention the term total digestible BAI fraction [%] is used to denote the percentage of the initial amount of BAI [g] that is subject to digestion in all steps of the McDougall method. It can be calculated with the following formula:

Total digestible BAI fraction [%]=((initial amount of BAI [g]−residual amount of BAI after the $3^{rd}$ step of McDougall method [g])/(initial amount of BAI [g]))×100%.

Example: initial amount of BAI=5.0 g
residual amount of BAI after $3^{rd}$ step=0.5 g Total digestible BAI fraction [%]=((5.0 g−0.5 g)/(5.0 g))×100%=90%

The total digestible BAI fraction [g/kg] can be calculated by using the equation:

Total digestible BAI fraction [g/kg]=total digestible BAI fraction [%]*weight fraction of BAI in product [g/kg].

In the context of the present invention the term metabolizable amount of biologically active ingredient M(BAI) is used to denote the fraction of biologically active ingredient in grams per kg that has been released post-ruminally from the tested composition in the abomasum and small intestine of the ruminant and thus can be metabolized or utilized by the animal. Accordingly, the term metabolizable amount of biologically active ingredient is the fraction of biologically active ingredient in grams per kg that has been released post-ruminally from the tested composition and is subject to metabolization. It can be calculated according to the formula:

$$M(BAI)[g/kg] = \text{total digestible BAI fraction } [g/kg] - (1000 - RP(BAI [g/kg])) \text{ or}$$

$$M(BAI)[g/kg] = \text{total digestible BAI fraction } [g/kg] - \text{ruminally released BAI fraction } [g/kg].$$

The total digestible BAI fraction [g/kg] is used to denote the difference between the initial amount of BAI [g/kg] and the residual amount of BAI after step 3 of the McDougall method [g/kg]. The term rumen protected (RP) BAI [g/kg] is the residual amount of BAI after step 1 of the McDougall method. The ruminally released BAI fraction [g/kg] is the amount of BAI released in step 1 of the McDougall method.

Experiments have shown that very good yields for rumen protected BAI fraction and total digestible BAI fraction as well as metabolizable BAI fraction are obtained, when the composition has a coating which comprises from 60 wt.-%+/−10% to 80 wt.-%+/−10% of a saturated fat, e.g. hydrogenated fat, and from 20 wt.-%+/−10% to 40 wt.-%+/−10% of a fatty acid. Such composition allow to obtain a very high yield of metabolizable BAI, for example approximately 400 g/kg of metabolizable lysin. Further improvements are achieved with a coating which comprises from 70 wt.-%+/−10% to 80 wt.-%+/−10% of a saturated fat, e.g. hydrogenated fat, and from 30 wt.-%+/−10% to 20 wt.-%+/−10% of a fatty acid. Such coatings even allow to obtain a metabolizable BAI fraction of more than 500 g/kg for methionine, guanidinoacetic acid, and methionylmethionine.

In one embodiment of the composition according to the present invention the coating comprises from 70 wt.-%+/−10% to 80 wt.-%+/−10% of a saturated fat, e.g. a hydrogenated fat, and from 30 wt.-%+/−10% to 20 wt.-%+/−10% of a fatty acid.

As a further consequence of its very efficient coating, the present invention allows to provide compositions with a lower amount of the coating material, which allows to increase the loading of the biologically active ingredient in the product. Specifically, the coating according to the present invention allows to provide products with a loading of the biologically active ingredient of up 75 wt.-% or even 80 wt.-%, based on the pure biologically active ingredient, i.e. without additives such as binder or any other additional auxiliary agents. By comparison the products according to the technical teaching of US 2012/0093974 A1 typically contain more than 40 wt.-% of the coating, based on the total weight of the product. In other words, the products according to the technical teaching of US 2012/0093974 A1 have a loading with lysine sulfate of less than 60 wt.-%.

According to the present invention, the composition comprises from 5 wt.-%+/−10% to 30 wt.-%+/−10% of the coating, based on the total weight of the composition.

Preferably, the composition according to the present invention comprises from 10 wt.-%+/−10% to 30 wt.-%+/−10% of the coating, based on the total weight of the composition, from 15 wt.-%+/−10% to 30 wt.-%+/−10% of the coating, based on the total weight of the composition, from 20 wt.-%+/−10% to 30 wt.-%+/−10% of the coating, based on the total weight of the composition, from 15 wt.-%+/−10% to 25 wt.-%+/−10% of the coating, based on the total weight of the composition, or from 20 wt.-%+/−10% to 25 wt.-%+/−10% of the coating, based on the total weight of the composition. In particular, the composition according to the present invention comprises 15 wt.-%+/−10%, 16 wt.-%+/−10%, 17 wt.-%+/−10%, 18 wt.-%+/−10%, 19 wt.-%+/−10%, 20 wt.-%+/−10%, 21 wt.-%+/−10%, 22 wt.-%+/−10%, or 23 wt.-%+/−10%, 24 wt.-%+/−10%, 25 wt.-%+/−10%, 26 wt.-%+/−10%, 27 wt.-%+/−10%, 28 wt.-%+/−10%, 29 wt.-%+/−10%, or 30 wt.-% of the coating, based on the total weight of the composition.

In any case, metabolizable fractions of more than 370 g/kg of the biologically active ingredient were achieved when the composition comprises from 20 wt.-%+/−10% to 30 wt.-%+/−10% of the coating, based on the total weight of the composition.

In one embodiment, the composition according to the present invention comprises from 20 wt.-%+/−10% to 30 wt.-%+/−10% of the coating, based on the total weight of the composition.

Preferably, the composition according to the present invention comprises from 20 wt.-%+/−10% to 30 wt.-%+/−10% of the coating, based on the total weight of the composition, wherein said coating comprises from 70 wt.-%+/−10% to 80 wt.-%+/−10% of the saturated fat and from 30 wt.-%+/−10% to 20 wt.-%+/−10% of the fatty acid.

Preferably, the core of the composition according to the present invention consists of the biologically active ingredient itself. In this way the loading of the composition according to the present invention with the biologically active ingredient can be further increased. However, there may be still cases where the core does not only consist of the biologically active ingredient itself. This is the case for example when further additives are necessary in order to provide granulates or spherical particles of the biologically active ingredient or when the biologically active ingredient in pure form is only poorly soluble in water and therefore has be converted into its acid addition salt such as lysine hydrochloride or lysine hydrosulfate.

The specific choice of the saturated fat, e.g. hydrogenated fat, may also make a valuable contribution in order to achieve the desired effect of high amounts of metabolizable biologically active ingredient (BAI). It was found that the selective choice of a suitable saturated fat, e.g. hydrogenated fat, leads to a product with a flawless coating, which is believed to contribute to achieving a high rumen protected BAI fraction. It is further believed that the use of a saturated fat, e.g. hydrogenated fat, with a melting point as wide as possible, or in other words a melting range as wide as possible, in particular allows the production of a BAI comprising product which give a high rumen protected BAI fraction. In particular, the use of a coating material with a melting range as wide as possible may permit the preparation of compositions which do not have any defects, such as cracks, breaks or other flaws in the protective coating layer around the BAI comprising core or which at least have only a very low number of such defects. Without wishing to be bound to a specific theory, it is believed that this effect may be based on the different melting points of the components in a coating material with a wide melting range: the high-melting-point fraction of the molten coating material is solidified faster than the low-melting-point fraction of the molten coating material. Thus, it is believed that the still liquid or (highly) viscous fraction can fill or seal defects in the coating during the production of a biologically active ingredient. Substances with a broad melting range which may be suitable for the preparation of the composition of the present invention are, for example, partly or fully hydrogenated fats or oils of a natural fat or oil, which natural fat or oil is composed of saturated, monounsaturated or polyunsaturated fatty acids of different chain lengths with a different degree of saturation which are esterified with glycerol or contain different additives such as phospholipids, sphingolipids, cholesterol or others. A further advantage of the coating as taught herein is that it adds nutritional value to the composition according to the present invention.

Vegetable oils contain a mixture of various fats, among them saturated fats, monounsaturated fats and polyunsaturated fats. For example, palm oil contains about 46% of saturated fats, 46% of monounsaturated fats and 8% polyunsaturated fats, and soybean oil contains about 14% of saturated fats, 24% of monounsaturated fats and 62% of polyunsaturated fats. Further, vegetable oils also contain a variety of glycerides of different fatty acids, i.e. fatty acids with different chain lengths. For example, palm oil contains about 41 to about 46% of glycerides of palmitic acid, about 37 to about 42% of glycerides of oleic acid, about 8 to about 10% of glycerides of linoleic acid, about 4 to about 7% of glycerides of stearic acid, and about 2% or less of glycerides of other fatty acids, and soybean oil contains about 17 to about 31% of glycerides of oleic acid, about 48 to about 59% of glycerides of linoleic acid, about 2 to about 11% of glycerides of linolenic acid, and glycerides of other fatty acids, such as about 2 to about 11% of glycerides of palmitic acid and/or about 2 to 7% of glycerides of stearic acid. Possible saturated fats or oils in the context of the present invention are for example hydrogenated plant oils, such as palm oil, soya oil, rapeseed oil, sunflower oil or castor oil, or hydrogenated animal fats such as beef tallow. Further coating materials in the context of the present invention are natural waxes such as bees wax. Accordingly, the present invention is not subject to any limitations regarding the use of a specific hydrogenated fat and in particularly, with respect to the use of a specific hydrogenated fat. However, it was found that the use of a hydrogenated vegetable oil provides the compositions according to the present invention with a high rumen protected fraction of the biologically active ingredient. Preferably, said hydrogenated vegetable oil is completely hydrogenated.

In one embodiment of the composition according to the present invention the saturated fat comprises or consists of a hydrogenated fat, e.g. a hydrogenated vegetable oil.

In principle, the composition according to the present invention is also not subject to any limitations regarding the number of hydrogenated vegetable oils. Therefore, the hydrogenated fat can also be a mixture of two or more hydrogenated vegetable oils, for example two, three or even more hydrogenated vegetable oils. Suitable hydrogenated vegetable oils comprise hydrogenated palm oil, hydrogenated rapeseed oil and hydrogenated soybean oil.

It was further found that products according to the present invention, wherein the saturated fat is a hydrogenated fat and said hydrogenated fat is a hydrogenated palm oil, hydrogenated soybean oil, and/or hydrogenated rapeseed oil, allow the release of a high fraction of biologically active ingredient in the small intestine and thus allow to provide the ruminant with a high amount of metabolizable biologically active ingredient. In this respect, it was also found that these products appeared to have a coating which was very smooth and had a uniform appearance without any defects. It is believed that this is due to the wide range of melting points of the various glycerides with different saturated fatty acids comprised in the hydrogenated palm oil, hydrogenated soybean oil, and the hydrogenated rapeseed oil.

In an embodiment of the composition according to the present invention the hydrogenated fat comprises or consists of a hydrogenated palm oil, hydrogenated soybean oil and/or hydrogenated rapeseed oil.

The product according to the present invention is not subject to any limitations regarding the number of fatty acids. Further, the product according to the present invention is also not subject to any limitations regarding the chain lengths of the one or more fatty acids. The most prevalent fatty acids in hydrogenated vegetable oils, such as palm oil, hydrogenated soybean oil, and/or rapeseed oil, are $C_{14}$ to $C_{22}$ carboxylic acids.

In a further embodiment of the composition according the present invention the fatty acid comprises or consists of a $C_{14}$ to $C_{22}$ carboxylic acid.

It was further found that a fatty acid with a similar or even identical chain length as those of the different fatty acids which are parts of the glycerides of a hydrogenated vegetable oil in the coating of the products according to the present invention have a benefit on the quality of the coating. Without wishing to be bound to a specific theory, it is believed that this may be due to the good miscibility of the fatty acids with a similar or even identical chain length as those of the different fatty acids which are parts of the glycerides of a hydrogenated vegetable oil. Thus, they may give a homogenous mixture which is believed to contribute to the smooth surface and the uniform appearance of the coating of the products according to the present invention. Particularly preferred hydrogenated vegetable oils are palm oil and/or soybean oil. The most prevalent fatty acids in these hydrogenated vegetable oils are $C_{16}$ to $C_{20}$ carboxylic acids.

In an embodiment of the composition according to the present invention the fatty acid comprises or consists of a $C_{16}$ to $C_{20}$ carboxylic acid.

Examples of suitable $C_{16}$ to $C_{20}$ carboxylic acids are palmitic acid, margaric acid, stearic acid, nonadecylic acid, arachidic acid, and behenic acid.

Preferably, the fatty acid comprises or consists of a palmitic acid, margaric acid, stearic acid, nonadecylic acid, arachidic acid, and/or behenic acid.

According to the present invention the saturated fat comprised in the coating of the product according to the present invention is a hydrogenated fat, e.g. a hydrogenated vegetable oil. In order to further facilitate the mixing of the fat with the fatty acid, it is therefore preferred that the fatty acid in the coating is also hydrogenated or saturated.

In one embodiment of the composition according to the present invention the fatty acid comprises or consists of a saturated fatty acid.

Fatty acids, which are present in the glycerides of hydrogenated vegetable oils, are believed to be very well miscible with hydrogenated palm oil and/or rapeseed oil are palmitic acid, oleic acid, and/or stearic acid. Optionally, these fatty acid may be substituted, e.g. with an alkyl group, provided that this does not change their miscibility with the hydrogenated vegetable oil.

In one embodiment of the composition according to the present invention the fatty acid comprises or consists of an optionally substituted palmitic acid, oleic acid, and/or stearic acid.

In a preferred embodiment the fatty acid is stearic acid.

The coating in the products according to the present invention is not subject to any limitation regarding the number of layers. It is preferred to apply more than one, e.g. two, three, or multiple layers of a coating as taught herein to prevent or conceal defects, e.g. cracks, and pores, formed in the coating during the preparation of the products. In addition, a mechanical impact on the products according to the present invention during their further handling may lead to micro-fissures or cracks in the outer layer. However, an overlap of the two or more layers significantly reduces or even avoids the danger of a potential leakage of the biologically active ingredient during the residence time of the products according to the present invention in the rumen. Thus, the presence of two or more layers in the coating of the products according to the present invention can also contribute to high yield of the rumen protected fraction of the biologically active ingredient. Preferably, the two or more layers of the coating each have a different composition, provided that the coating as such, comprising the two or more layers, comprises the amounts of saturated fat, e.g. hydrogenated fat, and fatty acid according to the present invention. This allows to optimize the outer and the inner layer of the coating with respect to the different conditions in the rumen and in the intestinal tract.

In a further embodiment of the composition according to the present invention the coating comprises at least two layers, wherein each of the layers has a different composition of the coating mixture.

It was found that a product with a coating, wherein the first or most inward layer of the coating, which surrounds the biologically active ingredient, comprises a higher amount of fatty acid than the second or any further layer, which surround the first or any other additional, i.e. preceding or succeeding, layer, provides for a very high yield in both rumen protected BAI fraction and total digestible BAI fraction, as well as metabolizable BAI fraction. Without wishing to be bound to a specific theory, it is believed that this effect is due to the different ruminal, i.e. inside the rumen, or post-ruminal, i.e. after the rumen, solubility of the fatty acid: The solubility of a fatty acid is believed to be higher in the post-ruminal alkaline medium than in the ruminal acidic medium. Therefore, a higher amount of a fatty acid favors the dissolution of the respective coating layer. In order to provide for a high rumen protection it is therefore preferred that an outer coating layer has a relatively low concentration of the fatty acid. In contrast, a higher concentration of the fatty acid is preferred for an inner coating layer, in particular the first coating layer, in order to facilitate its dissolution in the small intestine of the ruminant.

In yet a further embodiment of the composition according to the present invention the first layer of the coating surrounding the biologically active ingredient has a higher amount of the fatty acid than the second or any further layer surrounding the first or any additional, e.g. preceding or succeeding, layer.

In context of the present invention the term first layer of a coating is used to denote the layer which directly surrounds the core comprising or consisting of the biologically active ingredient and thus represents the most inward layer. Accordingly, the term second layer of a coating is used to denote the layer which surrounds the first layer, and the term any further layer of a coating is used to denote the layer which surround said second or any other additional, i.e. preceding or succeeding, layer.

Specifically, it was found that a composition according to the present invention with two or more layers, where the first or most inward layer comprises from 60 wt.-%+/−10% to 90 wt.-%+/−10% of a saturated fat, e.g. hydrogenated fat, and from 10 wt.-%+/−10% to 40 wt.-%+/−10% of a fatty acid, based on the weight of said layer, and the second or any further layer comprises from 60 wt.-%+/−10% to 99 wt.-%−10% of a saturated fat, e.g. hydrogenated fat, and from 1 wt.-%+/−10% to 40 wt.-%+/−10% of a fatty acid, based on the weight of said layer, provides for a very high yield in both rumen protected and digestible fraction as well as metabolizable amount of the biologically active ingredient.

In one embodiment of the composition according to the present invention the first layer comprises from 60 wt.-%+/−10% to 90 wt.-%+/−10% of the saturated fat and from 10 wt.-%+/−10% to 40 wt.-%+/−10% of the fatty acid, based on the weight of the first layer, and the second or any further layer comprises from 60 wt.-%+/−10% to 99 wt.-%−10% of the saturated fat and from 1 wt.-%+/−10% to 40 wt.-%+/−10% of the fatty acid, based on the weight of the second or any further layer.

Preferably, the composition according to the present invention comprises from 4 to 29 wt.-% of a first layer, based on the total weight of the composition, with from 60 wt.-%+/−10% to 90 wt.-%+/−10% of the saturated fat and from 10 wt.-%+/−10% to 40 wt.-%+/−10% of the fatty acid, based on the weight of the first layer, and from 1 to 15 wt.-% of a second or any further layer, based on the total weight of the composition, with from 60 wt.-%+/−10% to 99 wt.-%−10% of the saturated fat and from 1 wt.-%+/−10% to 40 wt.-%+/−10% of the fatty acid, based on the weight of the second or any further layer. In particular, the composition comprises from 5 to 29 wt.-%, from 10 to 29 wt.-%, from 15 to 29 wt.-%, or from 20 to 29 wt.-% of said first layer, and from 1 to 15 wt.-%, from 1 to 10 wt.-%, from 5 to 15 wt.-%, or from 5 to 10 wt.-% of said second or any further layer.

In a further embodiment of the composition according to the present invention the first layer comprises from 70 wt.-%+/−10% to 80 wt. %+/−10% of the saturated fat and from 20 wt.-%+/−10% to 30 wt.-%+/−10% of the fatty acid, based on the weight of the first layer, and the second or any further layer comprises from 70 wt.-%+/−10% to 99 wt.-%−10% of the saturated fat and from 10 wt.-%+/−10% to 25 wt.-%+/−10% of the fatty acid, based on the weight of the second or any further layer.

Preferably, the composition according to the present invention comprises 4 to 29 wt.-% of a first layer, based on the total weight of the composition, with from 70 wt.-%+/−10% to 80 wt. %+/−10% of the saturated fat and from 20 wt.-%+/−10% to 30 wt.-%+/−10% of the fatty acid, based on the weight of the first layer, and from 1 to 15 wt.-% of a second or any further layer, based on the total weight of the composition, with from 70 wt.-%+/−10% to 99 wt.-%−10% of the saturated fat and from 10 wt.-%+/−10% to 25 wt.-%+/−10% of the fatty acid, based on the weight of the second or any further layer. In particular, the composition comprises from 5 to 29 wt.-%, from 10 to 29 wt.-%, from 15 to 29 wt.-%, or from 20 to 29 wt.-% of said first layer, and from 1 to 10 wt.-%, from 5 to 15 wt.-%, or from 5 to 10 wt.-% of said second or any further layer.

In yet another embodiment of the composition according to the present invention the first layer surrounding the non-protein nitrogen compound has a higher amount of the coating mixture than the second or any further layer surrounding the first or any further, e.g. preceding or succeeding, layer.

It is therefore understood that, depending on the number of coating layers applied onto the core or particle comprising or consisting of the biologically active ingredient, the particle size of the compositions may be varied to obtain a given or desired particle size of the final product. It is preferred that the size of the compositions according to the present invention are such that they are regurgitated or vomited by a ruminant upon ingestion.

Therefore, the preferred average particle size of the compositions according to the present invention is in the range of ca. 1 mm to ca. 6 mm, ca. 1.2 mm to ca. 5 mm, ca. 1.2 mm to ca. 4 mm, ca. 1.4 mm to ca. 3 mm, ca. 1.2 mm to ca. 2.8 mm, ca. 1.4 mm to ca. 2.6 mm, ca. 1.6 mm to ca. 2.4 mm, ca. 1.6 mm to ca. 2.2 mm or in the range of ca. 2 mm.

It is particularly preferred that the compositions according to the present invention have an average particle size of at least 2 mm for reducing the change of regurgitation or vomiting by a ruminant upon ingestion.

When preparing the product according to the present invention, it may be advantageous to add one or more additional ingredients to the coating as taught herein. Representative, non-limiting examples of such ingredients include lecithin, waxes (e.g. carnauba wax, beeswax, natural waxes, synthetic waxes, paraffin waxes, and the like), fatty acid esters, magnesium carbonate, calcium carbonate, calcium phosphate, calcium pyrophosphate, calcium hydrogen phosphate hydrates, calcium hydrogen phosphate dihydrate, calcium dihydrogen pyrophosphate, magnesium pyrophosphate, magnesium hydrogen phosphate hydrates, aluminium phosphate, magnesium hydroxide, aluminium hydroxide, manganese oxide, zinc oxide, sodium hydrogen carbonate, and ferric oxide, and mixtures thereof, and others. The addition of one or more of such ingredients may be beneficial to further increase the rumen protected fraction and/or the release and/or the digestion and/or the degradation of the biologically active ingredient in the abomasum and small intestine. The skilled person knows how to select suitable ingredients to achieve this purpose.

Alternatively, when preparing the product according to the present invention, it may also be advantageous to add other ingredient(s) such as one or more ingredients selected from binding substances (e.g. cellulose derivatives such as hydroxypropylcellulose, methyl cellulose, sodium carboxymethylcellulose, vinyl derivatives such as polyvinyl alcohol or polyvinylpyrrolidone, gum arabic, guaiac gum, sodium polyacrylate, and the like), filling substances (e.g. starch, proteins, crystalline cellulose and the like), inert ingredients (e.g. silica and silicate compounds), flow-control substances that help the formation of pellets (wheat middlings, beet pulp, and the like), preservative agents (propionic acid or its salt, sorbic acid or its salt, benzoic acid or its salt, dehydroacetic acid or its salt, parahydroxybenzoic acid esters, imazalil, thiabendazole, orthophenyl phenol, sodium orthophenylphenol, diphenyl, and others compounds and mixtures thereof), antibacterial agent, and other compounds. The skilled person is familiar with techniques and compounds which are useful to achieve these purposes, and which are compatible with the production of the product according to the present invention.

It may also be advantageous to further enhance the nutritional value and/or the therapeutic value of the product according to the present invention by adding further feed ingredients (e.g. nutritional ingredients, veterinary or medicinal agents etc.) or other ingredients to the compositions as taught herein.

For instance, one or more ingredients selected from grain products, plant products, animal products, proteins (e.g. protein ingredients as obtained from sources such as dried blood or meat meal, meat and bone meal, cottonseed meal, soybean meal, rapeseed meal, sunflower seed meal, canola meal, safflower meal, dehydrated alfalfa, corn gluten meal, soybean protein concentrate, potato protein, dried and sterilized animal and poultry manure, fish meal, fish and poultry protein isolates, crab protein concentrate, hydrolyzed protein feather meal, poultry byproduct meal, liquid or powdered egg, milk whey, egg albumen, casein, fish solubles, cell cream, brewers residues, and the like), mineral salts, vitamins (e.g. thiamine HCl, riboflavin, pyridoxine HCl, niacin, inositol, choline chloride, calcium pantothenate, biotin, folic acid, ascorbic acid, vitamin B12, p-aminobenzoic acid, vitamin A acetate, vitamin K, vitamin D, vitamin E, and the like), sugars and complex carbohydrates (e.g. water-soluble and water-insoluble monosaccharides, disaccharides, and polysaccharides), veterinary compounds (e.g. promazine hydrochloride, chloromedoniate acetate, chlorotetracycline, sulfamethazine, monensin, sodium monensin, poloxaline, oxytetracycline, BOVATEC, and the like), anti-oxidants (e.g. butylated hydroxyanisole, butylated hydroxytoluene, tertiary-butylhydroquinone, tocopherols, propyl gallate and ethoxyquin), trace element ingredients (e.g. compounds of cobalt, copper, manganese, iron, zinc, tin, nickel, chromium, molybdenum, iodine, chlorine, silicon, vanadium, selenium, calcium, magnesium, sodium and potassium and the like), and other compounds or ingredients, may be added to the product according to the present invention.

The skilled person is familiar with methods and ingredients that are suitable to enhance the nutritional and/or therapeutic or medicinal value of ruminant feeds, feed materials, premixes, feed additives, and feed supplements, and knows how to enhance the nutritional and/or therapeutic or medicinal value of the product according to the present invention.

In addition or as an alternative, it is also possible to combine the product according to the present invention with a feed, feed material, or premix for feeding a ruminant. In context of the present invention the term premix or nutrient premix is used as known to the person skilled in the art and denotes a mixture comprising one or more ingredients such as vitamins, trace minerals, medicaments, feed supplements and diluents. The use of premixes has the advantage that a farmer who uses his own grain can formulate his own rations and be assured his animals are getting the recommended levels of minerals and vitamins.

Another object of the present invention is therefore a feed, feed material, feed additive or premix for feeding a ruminant comprising the composition according to the present invention.

Preferably, the premix further comprises a vitamin, trace mineral, feed supplements diluents, and/or medicaments, such as antibiotics, probiotics and/or prebiotics.

In principle, the application of the coating as taught herein around a core comprising or consisting of a biologically active ingredient may be performed according to any suitable methods known in the art. However, it was found that the best method of providing a biologically active ingredient with a coating is the drum coating.

The term drum mixing as used in context with the present invention refers to a mixing technique in which the particles to be coated are filled into a fixed, i.e. not-moving or not-rotating, drum and the interior of the drum is equipped with moving mixing devices, such as rotating blades, which achieve the mixing of the particles to be coated with the coating material.

The term drum coating as used in context with the present invention refers to a mixing technique in which, in contrast to drum mixing, the particles to be coated are filled into a moving or rotating drum. Accordingly, in contrast to drum mixing the drum itself provides for the mixing of the particles to be coated with the coating material.

It was found that the use of a rumen bypass agent or coating material with a melting point as wide as possible, or in other words a melting range as wide as possible, is advantageous because it may allow the preparation of compositions which do not have any defects, such as cracks, breaks or other flaws in the protective coating layer around the core comprising or consisting of the biologically active ingredient or which at least have only a very low number of such defects. Without wishing to be bound to a specific theory, it is believed that this effect is based on the different melting points of the components in a coating material with a wide melting range: the high-melting-point fraction of the molten coating material may be solidified faster than the low-melting-point fraction of the molten coating material. Thus, the low-melting-point fraction of the molten coating material is believed to be still fluid or at least viscous for a certain time period. Possibly occurring damages in the coating layer due to cracks, breaks or failures can be immediately filled and closed by the still liquid low-melting-point fraction of the coating material during the coating process. Hereinafter, this effect is also referred to as sealing or self-healing.

Without wishing to be bound to a specific theory, it is believed that in order to achieve the aforementioned self-healing of defects in the coating layer, i.e. the filling and closing of damages in the coating layer due to cracks, breaks or failures, the still liquid or (highly) viscous fraction of the rumen bypass agent or coating material, which is present on the particles in the moved bed of particles, is preferably directly transferred from one particle to other particles through the direct contact of the particles. The direct contact of the particle may, for example, be achieved through the continuous movement of the particles in the bed of particles, e.g. as occurs in a rotating drum coater. In a rotating drum coater the particles are moved continuously and as a consequence a particle is always in direct or at least close contact with many other particles. As a consequence excess amounts of the liquid or (highly) viscous fraction of the coating mixture or coating material, which may locally occur on the surface of a particle may be transferred through intensive contact among the particles and the adhesive forces caused by this contact from one particle to another particle, which has less coating on its surface. This transfer, the direct contact of the particles among each other and the permanent movement of the particles is believed to lead to the closure and sealing of defects in a coating layer. It is further believed that the permanent rolling of the particles also removes irregularities from the surface of the coating on the particles and leads to a filling and a steady closing of holes in said coating with liquid or (highly) viscous coating material.

A further advantage of using the drum coating for the preparation of the compositions as taught herein is that it allows an adjustment as precise as possible of the effective temperature of the bed of particles by controlling the supplied and the discharged heat amount by continuous regulation of the feed streams of the molten coating material and optional cooling gas. The temperature level can be raised by increasing the mass stream of the added molten coating material or in a limited way by increasing the temperature of the supplied cooling gas. The temperature level can be decreased by lowering the mass stream of the added molten coating material or by decreasing the temperature of the cooling gas. The effective temperature of the particle bed also particularly depends on the preheating temperature of the provided particles, i.e. cores comprising or consisting of the biologically active ingredient, at the start of the coating procedure. The very efficient control of the temperature in the coating process also supports the self-healing of the coating surface of particles, in particular when coating materials with a wide melting range are used. It is believed that the efficient temperature in drum coating allows to specifically solidify those components of the coating material at first, which have a high melting point, and then to solidify step-wise those components of the coating material, which have lower melting points. The low-melting fraction of the coating material is still liquid or (highly) viscous when the high-melting fraction has just solidified and therefore, said low-melting fraction can fill and seal breaks and holes in the coating layer of a composition according to the present invention.

A further object is a process for the preparation of a composition according to the present invention, comprising the steps of a) providing particles containing or consisting of a biologically active ingredient selected from the list consisting of i) amino acids, derivatives of amino acids, and/or salts of amino acids and/or of their derivatives, ii) proteins, iii) peptides, iv) carbohydrates, v) vitamins, and substances having similar functions, vi) probiotic microorganisms, vii) prebiotic foods, viii) choline and salts and/or derivatives thereof, and ix) polyunsaturated fatty acids (PUFAs), and salts and/or derivatives thereof in a drum coater,
b) providing a mixture comprising from 60 wt.-%+/−10% to 80 wt.-%+/−10% of a saturated fat and from 20 wt.-%+/−10% to 40 wt.-%+/−10% of a fatty acid, each based on the total weight of the mixture, in a reservoir outside the drum coater,
c) heating the particles of step a) to a temperature in the range of from 20° C. below the lower melting point of the mixture of step b) to the upper melting point of the mixture of step b),
d) heating the mixture of step b) to a temperature in the range of from its upper melting point to 20° C. above its upper melting point,
e) applying the heated mixture of step d) onto the particles of step c) in a rotating drum coater,
f) maintaining the temperature of the bed of particles obtained in step e) at a temperature in the range of from 20° C. below the lower melting point of the mixture of step b) to the lower melting point of the mixture of step b), and
g) cooling the composition obtained from step f) or allowing the composition obtained from step f) to cool down, wherein the steps c) to f) or c) to g) are repeated with the composition obtained from step f) or g), if the composition to be prepared has two or more layers.

In step e) of the process according to the present invention, the heated mixture is preferably applied onto the particles by means of drop lance. This has the benefit that the heated mixture can be punctually applied into the middle of the particle bed, which further allows to achieve a very homogeneous distribution of the heated mixture throughout the particle bed quickly.

The specific temperature in steps c), d) and f) can be measured with any suitable means for measuring a temperature, for example a thermometer or a thermal imaging camera. For measuring the temperature with a thermometer or a thermal imaging camera, the thermometer or thermal imaging camera may be directed onto the particle bed of steps a) and c), the mixture of steps b) and d), and the bed of particles of steps e) and f) onto which the mixture of step d) is applied. In any case the thermometer or thermal imaging camera may be positioned suitably, e.g. far enough from the drop lance in order to minimize or avoid any temperature influences from the coating mixture, which is introduced via the drop lance.

In the context of the present invention the term lower melting point is used to denote the temperature at which a mixture, i.e. the coating mixture, starts to melt, i.e. when it starts to soften. The term upper melting point is used in the context of the present invention to denote the temperature at which the complete mixture, i.e. the coating mixture, is melted. Together, the lower melting point and the upper melting point of a mixture, i.e. coating mixture, define the melting range of a mixture, i.e. coating mixture.

The specific melting point of the coating mixture depends on the individual composition of the coating mixture, specifically, the selection of the one or more individual saturated fat, e.g. hydrogenated fat, and the amount thereof as well as the one or more individual fatty acid and the amount thereof. The determination of the melting points, i.e. lower and upper melting points, is within the routine skills of the person skilled in the art. For example, the determination of the melting points, i.e. lower and upper melting points, can be done by applying 1 g of the micronized coating mixture to a melting point apparatus, such as a melting point apparatus according to Kofler (Wagner & Munz). Reference materials with known melting points can be used as an indicator. The lower melting point is determined the temperature at which a mixture, i.e. the coating mixture, starts to melt, i.e. when it starts to soften and the upper melting point is determined as the temperature at which the complete mixture, i.e. the coating mixture, is melted.

The table 1 below summarizes the composition of some coating mixtures according to the present invention and their corresponding lower and upper melting points.

TABLE 1

Coating compositions and their lower and upper melting points
(HRO = hydrogenated rapeseed oil, HPO = hydrogenated palm oil, SA = stearic acid)

| Coating composition [wt.-%/wt.-%] | Lower melting point [° C.] | Upper melting point [° C.] |
|---|---|---|
| HPO = 100 | 57 | 61 |
| HRO = 100 | 67 | 70 |
| HPO/SA = 80/20 | 56 | 62 |
| HRO/SA = 80/20 | 63 | 68 |
| HPO/SA = 85/15 | 55.5 | 60.5 |
| HRO/SA = 85/15 | 63 | 68 |
| HPO/SA = 65/35 | 55 | 60.5 |
| HPO/SA = 66/34 | 55 | 60.5 |
| HPO/SA = 60/40 | 57 | 60 |
| SA = 100 | 63 | 69 |

In one embodiment of the preparation process according to the present invention the mixture comprises from 70 wt.-%+/−10% to 80 wt.-%+/−10% of a saturated fat and from 30 wt.-%+/−10% to 20 wt.-%+/−10% of a fatty acid.

In one embodiment, the amount of the mixture in step b) and/or step d) of the preparation process according to the present invention ranges from 5 wt.-%+/−10% to 30 wt.-%+/−10%, from 10 wt.-%+/−10% to 30 wt.-%+/−10%, from 15 wt.-%+/−10% to 30 wt.-%+/−10%, or from 20 wt.-%+/−10% to 30 wt.-%+/−10% of the total weight of the composition to be prepared or relative to the particles provided in step a). For example, when the amount of the mixture of step b) and/or step d) ranges from 5 wt.-%+/−10% to 30 wt.-%+/−10% of the total weight of the composition to be prepared, the weight ratio of the particles to be coated to the mixture of step b) and/or step d) is from 70:30 to 95:5. For example, when the amount of the mixture of step b) and/or step d) ranges from 10 wt.-%+/−10% to 30 wt.-%+/−10% of the total weight of the composition to be prepared, the weight ratio of the particles to be coated to the mixture of step b) and/or step d) is from 70:30 to 90:10. For example, when the amount of the mixture of step b) and/or step d) ranges from 15 wt.-%+/−10% to 30 wt.-%+/−10% of the total weight of the composition to be prepared, the weight ratio of the particles to be coated to the mixture of step b) and/or step d) is from 70:30 to 85:15. For example, when the amount of the mixture of step b) and/or step d) ranges from 20 wt.-%+/−10% to 30 wt.-%+/−10% of the total weight of the composition to be prepared, the weight ratio of the particles to be coated to the mixture of step b) and/or step d) is from 70:30 to 80:20.

In principle, the preparation process according to the present invention is not subject to any limitations regarding the number of saturated fats comprised by the mixture of step b) and/or d). Therefore, said mixture can comprise one or more saturate fats. Analog, the preparation process according to the present invention is also not subject to any limitations regarding the number of fatty acids comprised by the mixture of step b) and/or d). Therefore, said mixture can comprise one or more fatty acids.

Preferably, the saturated fat of the mixture of the preparation process comprises or consists of a hydrogenated fat, e.g. a hydrogenated vegetable oil.

Preferably, the hydrogenated fat of the mixture of the preparation process according to the present invention comprises or consists of a hydrogenated palm oil, hydrogenated soybean oil and/or hydrogenated rapeseed oil.

Preferably, the fatty acid of the mixture of the preparation process according to the present invention comprises or consists of a $C_{14}$ to $C_{22}$ carboxylic acid, in particular of a $C_{16}$ to $C_{20}$ carboxylic acid. Preferably, the fatty acid comprises or consists of a palmitic acid, margaric acid, stearic acid, nonadecylic acid, arachidic acid, and/or behenic acid.

Preferably, the fatty acid of the mixture of the preparation process according to the present invention comprises or consists of a saturated fatty acid.

Preferably, the fatty acid comprises or consists of an optionally substituted palmitic acid, oleic acid, and/or stearic acid, in particular a stearic acid.

Preferably, the fatty acid is stearic acid.

In one embodiment of the preparation process according to the present invention the composition to be prepared has at least two layers, i.e. the steps c) to f) or c) to g) of said preparation process are repeated with the product obtained from step f) or g).

In an embodiment of the preparation process according to the present invention the mixture of step b) and/or d) for preparing the first layer surrounding the particles, i.e. in the first run of the steps c) to f) or c) to g), has a higher amount of the fatty acid than in the second or any further layer surrounding the first or any additional, e.g. preceding or succeeding, layer, i.e. in the second or any further run of the step c) to f) or c) to g).

In a preferred embodiment of the preparation process according to the present invention the mixture for preparing the first layer surrounding the particles, i.e. in the first run of the steps c) to f) or c) to g), comprises from 60 wt.-%+/−10% to 90 wt.-%+/−10% of the saturated fat and from 10 wt.-%+/−10% to 40 wt.-%+/−10% of the fatty acid, based on the weight of the first layer to be prepared, and the mixture for preparing the second or any further layer, i.e. in the second or any further run of steps c) to f) or c) to g), comprises from 60 wt.-%+/−10% to 99 wt.-%–10% of the saturated fat and from 1 wt.-%+/−10% to 40 wt.-%+/−10% of the fatty acid, based on the weight of the second layer to be prepared.

Preferably, the amount of the mixture for the first layer with from 60 wt.-%+/−10% to 90 wt.-%+/−10% of the saturated fat and from 10 wt.-%+/−10% to 40 wt.-%+/−10% of the fatty acid, based on the weight of the first layer ranges from 4 to 29 wt.-%, based on the composition to be prepared, and the amount of the mixture for the second or any further layer, with from 60 wt.-%+/−10% to 99 wt.-%−10% of the saturated fat and from 1 wt.-%+/−10% to 40 wt.-%+/−10% of the fatty acid, based on the weight of the second or any further layer, ranges from 1 to 15 wt.-%, based on the composition to be prepared. In particular, the composition to be prepared comprises from 5 to 29 wt.-%, from 10 to 29 wt.-%, from 15 to 29 wt.-%, or from 20 to 29 wt.-% of said first layer, and from 1 to 10 wt.-%, from 5 to 15 wt.-%, or from 5 to 10 wt.-% of said second layer.

In another preferred embodiment of the preparation process according to the present invention the mixture for preparing the first layer surrounding the particles, i.e. in the first run of the steps c) to f) or c) to g), comprises from 70 wt.-%+/−10% to 80 wt. %+/−10% of the saturated fat and from 20 wt.-%+/−10% to 30 wt.-%+/−10% of the fatty acid, based on the weight of the first layer to be prepared, and the mixture for preparing the second or any further layer, i.e. in the second or any further run of steps c) to f) or c) to g), comprises from 70 wt.-%+/−10% to 99 wt.-%−10% of the saturated fat and from 10 wt.-%+/−10% to 25 wt.-%+/−10% of the fatty acid, based on the weight of the second layer to be prepared.

Preferably, the amount of the mixture for the first layer with from 70 wt.-%+/−10% to 80 wt. %+/−10% of the saturated fat and from 20 wt.-%+/−10% to 30 wt.-%+/−10% of the fatty acid, based on the weight of the first layer ranges from 4 to 29 wt.-%, based on the composition to be prepared, and the amount of the mixture for the second or any further layer, with from 70 wt.-%+/−10% to 99 wt.-%−10% of the saturated fat and from 10 wt.-%+/−10% to 25 wt.-%+/−10% of the fatty acid, based on the weight of the second or any further layer, ranges from 1 to 15 wt.-%, based on the composition to be prepared. In particular, the composition to be prepared comprises from 5 to 29 wt.-%, from 10 to 29 wt.-%, from 15 to 29 wt.-%, or from 20 to 29 wt.-% of said first layer, and from 1 to 10 wt.-%, from 5 to 15 wt.-%, or from 5 to 10 wt.-% of said second layer.

In yet another embodiment of the preparation process according to the present invention the amount of the mixture in the first run of steps c) to f) or c) to g) is higher than in the second or any further run of the steps c) to f) or c) to g).

It was further found that administering to a ruminant, the composition according to the present invention, a composition obtained or obtainable by a process according to the present invention and/or a feed, feed material, premix or feed additive according to the present invention is suitable to compensate amongst others for a lack of nutrients and essential amino acids in a ruminant diet. The same also applies Yet a further object of the present invention is therefore a method of supplementing the diet of a ruminant with a biologically active ingredient, comprising the step of providing the ruminant with a composition according to the present invention and/or with a feed, feed material, premix or feed additive according to the present invention.

The present invention is further described by the following items:

1. A composition for feeding a ruminant comprising
   a) a core comprising or consisting of a biologically active ingredient selected from the list consisting of i) amino acids, derivatives of amino acids, and/or salts of amino acids and/or of their derivatives, ii) proteins, iii) peptides, iv) carbohydrates, v) vitamins, and ingredients having similar functions, vi) probiotic microorganisms, vii) prebiotic foods, viii) choline and salts and/or derivatives thereof, and ix) polyunsaturated fatty acids (PUFAs), and salts and/or derivatives thereof, and
   b) a coating surrounding said core, wherein said coating comprises one or more layers of a mixture comprising a saturated fat, e.g. a hydrogenated fat, and a fatty acid, and said coating comprises from 60 wt.-%+/−10% to 80 wt.-%+/−10% of the saturated fat, e.g. hydrogenated fat, and from 20 wt.-%+/−10% to 40 wt.-%+/−10% of the fatty acid, each based on the total weight of the coating.

2. Composition according to item 1, wherein the coating comprises from 70 wt.-%+/−10% to 80 wt.-%+/−10% of a saturated fat and from 20 wt.-%+/−10% to 30 wt.-%+/−10% of a fatty acid.

3. Composition according to item 1 or 2, wherein the composition comprises from 5 wt.-%+/−10% to 30 wt.-%+/−10% of the coating, based on the total weight of the composition.

4. Composition according to any of items 1 to 3, wherein the composition comprises from 20 wt.-%+/−10% to 30 wt.-%+/−10% of the coating, based on the total weight of the composition.

5. Composition according to any of items 1 to 4, wherein the saturated fat comprises or consists of a hydrogenated fat.

6. Composition according to item 5, wherein the hydrogenated fat is a hydrogenated vegetable oil.

7. Composition according to item 4 or 5, wherein the hydrogenated fat comprises or consists of hydrogenated palm oil, hydrogenated soybean oil and/or hydrogenated rapeseed oil.

8. Composition according to any of items 1 to 6, wherein the fatty acid comprises or consists of a $C_{14}$ to $C_{22}$ carboxylic acid.

9. Composition according to any of items 1 to 8, wherein the fatty acid comprises or consists of a $C_{16}$ to $C_{20}$ carboxylic acid.

10. Composition according to any of items 1 to 9, wherein the fatty acid comprises or consists of a saturated fatty acid.

11. Composition according to any of items 1 to 10, wherein the fatty acid comprises or consists of an optionally substituted palmitic acid, oleic acid, and/or stearic acid.

12. Composition according to any of items 1 to 11, wherein the coating comprises at least two layers, wherein each of the layers has a different composition of the coating mixture.

13. Composition according to any of items 1 to 12, wherein the first layer surrounding the biologically active ingredient has a higher amount of the fatty acid than the second or any further layer surrounding the first or any preceding layer.

14. Process for the preparation of a composition according to any of items 1 to 13, comprising the steps of
    a) providing particles containing or consisting of a biologically active ingredient selected from the list consisting of i) amino acids, derivatives of amino acids, and/or salts of amino acids and/or of their derivatives, ii) proteins, iii) peptides, iv) carbohydrates, v) vitamins, and ingredients having similar functions, vi) probiotic microorganisms, vii) prebiotic foods, viii) choline and salts and/or derivatives thereof, and ix) polyunsaturated fatty acids (PUFAs), and salts and/or derivatives thereof, in a drum coater, b) providing a mixture comprising from 60 wt.-%+/−10% to 80 wt.-%+/−10% of the saturated fat, e.g. hydrogenated fat, and from 20 wt.-%+/−10% to 40 wt.-%+/−10% of the fatty acid, each based on the total weight of the mixture, in a reservoir outside the drum coater, c) heating the particles of step a) to a temperature in the range of from 20° C. below the lower melting point of the mixture of step b) to the upper melting point of the mixture of step b), d) heating the mixture of step b) to a temperature in the range of from its upper melting point to 20° C. above its upper melting point, e) applying the heated mixture of step d) onto the particles of step c) in a rotating drum coater, f) maintaining the temperature of the bed of particles obtained in step e) at a temperature in the range of from 20° C. below the lower melting point of the mixture of step b) to the lower melting point of the mixture of step b), and g) cooling the composition obtained from step f) or allowing the composition obtained from step f) to cool down, wherein the steps c) to f) or c) to g) are repeated with the composition obtained from step f) or g), if the composition to be prepared has two or more layers.

15. Feed, feed material, premix of feed additive for feeding a ruminant comprising a composition according to any of items 1 to 13.

16. Method of supplementing the diet of a ruminant with a biologically active ingredient, comprising the step of providing the ruminant with a composition according to any of items 1 to 13 and/or with a feed, feed material, premix of fed additive according to item 15.

EXAMPLES

I. General Procedure for Preparing Coated Products:
Equipment used:
Drum coater (type SolidLab1 from Within)
Supply for the heated melt (stirred vessel equipped with pump and piping)
Distributor with 3 inlet points for the distribution of the heated melt in the drum coater Prior to the coating process itself, the coating material (hydrogenated palm oil, trade name Prefix® 125 and optionally the coating additive stearic acid in the desired ratio) was melted in the stirred vessel and subsequently heated to a temperature of 80° C.

Approximately 400 g of the biologically active ingredient to be coated and present either in granulated or in pelletized form, were filled into the drum coater and preheated. The preheating was carried out with warm ambient air having a temperature of approximately 50 to 60° C. at a slow drum rotation of approximately 3 to 5 rounds per minutes. When the heated particles had a temperature in the range between 20° below the lower melting point of the coating material and the lower melting point of the coating material, the rotation speed of the drum coater was increased to approximately 15 to 25 rounds per minute and the feeding of the melted coating material was started. During the coating the coating material was constantly added to the particles. Further, the inlet temperature and the rotation speed was set so that the temperature of the coated temperature was kept constant and that the movement of the coated product in the rotating drum coater was uniform. After addition of the desired amount of the coating material any further dosing of the melted coating material was stopped and the coated product was allowed to cool down, so that the coating material could solidify.

II. Preparation of Coated BAI Comprising Products

According to the general procedure for the preparation of coated products BAI comprising compositions, a multitude of examples according to the present invention and several comparative examples were prepared. The parameters of the individual coating preparations, such as the composition of the coating, the amount of coating in the final product and the biologically active ingredient are summarized in the table 1 below.

TABLE 2

Summary of the prepared compositions (GAA = guanidine acetic acid, met-met = methionyl methionine).

| Comp. No. | Biologically active ingredient (BAI) | BAI in composition [wt.-%] | 1st coating layer | | | 2nd coating layer | | | Total coating in comp. [wt.-%] | Total hydrog. palm oil in comp. [wt.-%] | Total stearic acid in comp. [wt.-%] |
|---|---|---|---|---|---|---|---|---|---|---|---|
| | | | amount in comp. [wt.-%] | hydrog. palm oil [wt.-%] | stearic acid [wt.-%] | amount in comp. [wt.-%] | hydrog. palm oil [wt.-%] | stearic acid [wt.-%] | | | |
| C-L1 | lysine | 49.8 | 30 | 100 | 0 | 0 | 0 | 0 | 30 | 30 | 0 |
| C-L2 | lysine | 49.8 | 30 | 90 | 10 | 0 | 0 | 0 | 30 | 27 | 3 |
| L1 | lysine | 49.8 | 30 | 80 | 20 | 0 | 0 | 0 | 30 | 24 | 6 |
| L2 | lysine | 49.8 | 30 | 75 | 25 | 0 | 0 | 0 | 30 | 22.5 | 7.5 |
| L3 | lysine | 49.8 | 30 | 70 | 30 | 0 | 0 | 0 | 30 | 21 | 9 |
| L4 | lysine | 53.3 | 25 | 75 | 25 | 0 | 0 | 0 | 25 | 18.75 | 6.25 |
| L5 | lysine | 56.9 | 20 | 75 | 25 | 0 | 0 | 0 | 20 | 15 | 5 |
| L6 | lysine | 51.5 | 27.5 | 80 | 20 | 0 | 0 | 0 | 27.5 | 22 | 5 |
| L7 | lysine | 53.5 | 25 | 80 | 20 | 0 | 0 | 0 | 25 | 20 | 5 |
| C-M1 | methionine | 65.8 | 30 | 100 | 0 | 0 | 0 | 0 | 30 | 30 | 0 |
| C-M2 | methionine | 65.8 | 30 | 90 | 10 | 0 | 0 | 0 | 30 | 27 | 3 |
| C-M3 | methionine | 65.8 | 24 | 75 | 25 | 6 | 100 | 0 | 30 | 24 | 6 |
| C-M4 | methionine | 65.8 | 24 | 84 | 16 | 6 | 64 | 36 | 30 | 24 | 6 |
| M1 | methionine | 65.8 | 30 | 75 | 25 | 0 | 0 | 0 | 30 | 22.5 | 7.5 |
| M2 | methionine | 65.8 | 30 | 70 | 30 | 0 | 0 | 0 | 30 | 21 | 9 |
| M3 | methionine | 70.5 | 25 | 80 | 20 | 0 | 0 | 0 | 25 | 20 | 5 |
| M4 | methionine | 70.5 | 25 | 75 | 25 | 0 | 0 | 0 | 25 | 18.75 | 6.25 |
| M5 | methionine | 70.5 | 25 | 70 | 30 | 0 | 0 | 0 | 25 | 17.5 | 7.5 |
| M6 | methionine | 75.2 | 20 | 80 | 20 | 0 | 0 | 0 | 20 | 16 | 4 |
| M7 | methionine | 79.9 | 15 | 80 | 20 | 0 | 0 | 0 | 15 | 12 | 3 |

TABLE 2-continued

Summary of the prepared compositions (GAA = guanidine acetic acid, met-met = methionyl methionine).

| Comp. No. | Biologically active ingredient (BAI) | BAI in composition [wt.-%] | 1st coating layer | | | 2nd coating layer | | | Total coating in comp. [wt.-%] | Total hydrog. palm oil in comp. [wt.-%] | Total stearic acid in comp. [wt.-%] |
|---|---|---|---|---|---|---|---|---|---|---|---|
| | | | amount in comp. [wt.-%] | hydrog. palm oil [wt.-%] | stearic acid [wt.-%] | amount in comp. [wt.-%] | hydrog. palm oil [wt.-%] | stearic acid [wt.-%] | | | |
| M8 | methionine | 84.6 | 10 | 80 | 20 | 0 | 0 | 0 | 10 | 8 | 2 |
| M9 | methionine | 89.3 | 5 | 80 | 20 | 0 | 0 | 0 | 5 | 4 | 1 |
| M10 | methionine | 65.8 | 24 | 76 | 24 | 6 | 96 | 4 | 30 | 24 | 6 |
| C-G1 | GAA | 65.2 | 30 | 100 | 0 | 0 | 0 | 0 | 30 | 30 | 0 |
| C-G2 | GAA | 69.8 | 25 | 100 | 0 | 0 | 0 | 0 | 25 | 25 | 0 |
| G-1 | GAA | 69.8 | 25 | 75 | 25 | 0 | 0 | 0 | 18.75 | 6.25 | 0 |
| G-2 | GAA | 69.8 | 25 | 70 | 30 | 0 | 0 | 0 | 17.5 | 7.5 | 0 |
| C-MM1 | met-met | 64.5 | 30 | 100 | 0 | 0 | 0 | 0 | 30 | 30 | 0 |
| C-MM2 | met-met | 69.1 | 25 | 100 | 0 | 0 | 0 | 0 | 25 | 25 | 0 |
| C-MM3 | met-met | 73.7 | 20 | 100 | 0 | 0 | 0 | 0 | 20 | 20 | 0 |
| MM1 | met-met | 69.1 | 25 | 75 | 25 | 0 | 0 | 0 | 25 | 18.75 | 6.25 |
| MM2 | met-met | 73.7 | 20 | 80 | 20 | 0 | 0 | 0 | 20 | 16 | 4 |
| MM3 | met-met | 73.7 | 20 | 70 | 30 | 0 | 0 | 0 | 20 | 14 | 6 |

III. Testing of the Products:

The products of the examples L1 to L7, M1 to M10, G1 to G2, and MM1 to MM3, and the products of the comparative examples C-L1 to C-L2, C-M1 to C-M4, C-G1 to C-G2, and C-MM1 to C-MM3 were subjected to in vitro tests to simulate the ruminal digestion, in particular to simulate the release rates of the biologically active ingredient in the three different compartments rumen, abomasum and small intestine of the ruminal digestive tract. For this purpose the tests were performed in a three-step incubation procedure: in the first step the conditions in the rumen were simulated by use of the McDougall's buffer, in the second step the conditions in the abomasum were simulated by use of hydrochloric acid and pepsin, and in the third step the conditions of the small intestine were simulated by use of pancreatin and a suitable buffer to adjust a pH of 8. The in vitro tests were performed according to the following procedure:

For the preparation of the McDougall's buffer the following substances were weighed into a 10 liters bottle:

| | | |
|---|---|---|
| $NaHCO_3$ | 98 g | (1.17 mol) |
| $Na_2HPO_4 \cdot 2\, H_2O$ | 46.3 g | (0.26 mol) |
| NaCl | 4.7 g | (0.08 mol) |
| KCl | 5.7 g | (0.08 mol) |
| $CaCl_2 \cdot 2\, H_2O$ | 0.4 g | (2.7 mmol) |
| $MgCl_2 \cdot 6\, H_2O$ | 0.6 g | (3.0 mmol) |

250 mL of the McDougall's buffer solution were filled into a 1000 mL Schott flask. 5 grams of the test substance, i.e. any of the compositions according to the present invention and any of the comparative products with a specific biologically active ingredient, were added, and the flasks were shaken at 100 rotations per minute in a lab shaker (Innova 40, New Brunswick Scientific) at 39° C. After 6 hours, the flask content was filtered off carefully, washed with 50 mL of cold water and directly transferred to the second flask containing 250 mL concentrated hydrochloric acid with pH 2 and a small amount of pepsin. After 2 hours incubation time at 39° C., the product was again filtered off carefully, washed with 50 mL of ambient water and subsequently transferred to a third flask containing freshly prepared solution containing 14.4 mg tri(hydroxymethyl)aminomethane, 56.2 mg NaCl, 231 mg phosphatidylcholin, 60 mg Triton-X-100, 240 mg Na taurocholate, 300 mg $CaCl_2 \times$ $2 H_2O$ and 120 mg pancreatin 8 USP lipase units/mg). After shaking for 24 hours, the product was filtered off, washed again with cold water and dried at 40° C. overnight. The residual product was weighted after each of the steps 1 and 3, and the weight loss was considered to be loss in biologically active ingredient (BAI). The calculation of the ruminal release fraction of the biologically active ingredient (BAI) was done with the following formula:

Ruminal BAI release fraction [%]=((initial amount of BAI [g]−residual amount of BAI after the $1^{st}$ step of the McDougall method [g])/(initial amount of BAI [g]))×100%.

Example: initial amount of BAI=5.0 g
residual amount of BAI=4.2 g

Ruminal BAI release fraction [%]=((5.0 g−4.2 g)/(5.0 g))×100%=16%

The rumen protected (RP) fraction of the biologically active ingredient (RP(BAI)) is obtained using the following formula:

RP(BAI)[%]=100%−ruminal BAI release fraction [%]

Example: BAI release fraction [%]=16%
RP(BAI) [%]=100%−16%=84%

The term total digestible BAI fraction [%] is used to denote the percentage of the initial amount of BAI [g] that is subject to digestion in all steps of the McDougall method. It can be calculated with the following formula:

Total digestible BAI fraction [%]=((initial amount of BAI [g]−residual amount of BAI after the $3^{rd}$ step of McDougall method [g])/(initial amount of BAI [g]))×100%.

Example: initial amount of BAI=5.0 g
residual amount of BAI after $3^{rd}$ step=0.5 g Total digestible BAI fraction [%]=((5.0 g−0.5 g)/(5.0 g))×100%=90%

The total digestible BAI fraction [g/kg] can be calculated by using the equation:

Total digestible BAI fraction [g/kg]=total digestible BAI fraction [%]*weight fraction of BAI in product [g/kg].

The term metabolizable amount of the biologically active ingredient M(BAI) is used to denote the fraction of the biologically active ingredient in grams per kg that has been released from the tested composition in the abomasum and small intestine of the ruminant and thus can be utilized by the animal. Accordingly, the term metabolizable amount of the biologically active ingredient is the fraction of BAI that is available for metabolization and utilization by the animal. It can be calculated according to the formula:

$$M(BAI)[g/kg]=\text{total digestible BAI fraction }[g/kg]-(1000-RP(BAI)[g/kg])\text{ or}$$

$$M(BAI)[g/kg]=\text{total digestible BAI fraction }[g/kg]-\text{ruminally relased BAI fraction }[g/kg].$$

The total digestible BAI fraction [g/kg] is the difference of the initial amount of BAI [g/kg] and the residual amount of BAI after the $3^{rd}$ step of the McDougall method [g/kg]. The RP(BAI [g/kg] is the residual amount of BAI [g/kg] after the $1^{st}$ step of the McDougall method. The ruminally released BAI fraction [g/kg] is the amount of BAI released in the $1^{st}$ step of the McDougall method.

The results are summarized in Table 3.

IV. Discussion:

The products of the examples L1 to L7, M1 to M10, G1 to G2, and MM1 to MM3 provided for better rumen protection BAI fractions as well as for better total digestible BAI fraction and higher metabolizable BAI fractions than the products of the comparative examples C-L1 to C-2, C-M1 to C-M4, C-G1 to C-G2, and C-MM1 to C-MM3.

TABLE 3

Summary of the results of the prepared products and the comparative products (GAA = guanidine acetic acid, met-met = methionyl methionine).

| Test No. | Comp. No. | Biologically active ingredient (BAI) | Rumen protection (BAI) [%] | Total digestible BAI fraction [%] | Metabolizable BAI fraction [g/kg] |
|---|---|---|---|---|---|
| T-C-L1 | C-L1 | lysine | 96.6 | 2.8 | 13 |
| T-C-L2 | C-L2 | lysine | 95.6 | 7.3 | 35 |
| T-L1 | L1 | lysine | 76.0 | 84.0 | 318 |
| T-L2 | L2 | lysine | 86.0 | 87.0 | 372 |
| T-L3 | L3 | lysine | 78.0 | 98.0 | 380 |
| T-L4 | L4 | lysine | 81.5 | 91.1 | 396 |
| T-L5 | L5 | lysine | 68.7 | 95.1 | 372 |
| T-L6 | L6 | lysine | 71.0 | 88.0 | 322 |
| T-L7 | L7 | lysine | 58.0 | 91.0 | 281 |
| T-C-M1 | C-M1 | methionine | 98.7 | 5.1 | 33 |
| T-C-M2 | C-M2 | methionine | 96.0 | 6.8 | 43 |
| T-C-M3 | C-M3 | methionine | 99.0 | 32.0 | 208 |
| T-C-M4 | C-M4 | methionine | 57.0 | 91.0 | 341 |
| T-M1 | M1 | methionine | 84.0 | 91.0 | 503 |
| T-M2 | M2 | methionine | 76.0 | 97.0 | 485 |
| T-M3 | M3 | methionine | 90.4 | 34.5 | 220 |
| T-M4 | M4 | methionine | 92.4 | 89.6 | 584 |
| T-M5 | M5 | methionine | 81.9 | 97.5 | 563 |
| T-M6 | M6 | methionine | 75.2 | 84.6 | 478 |
| T-M7 | M7 | methionine | 38.4 | 94.4 | 290 |
| T-M8 | M8 | methionine | 22.0 | 87.0 | 162 |
| T-M9 | M9 | methionine | 15.0 | 93.0 | 125 |
| T-M10 | M10 | methionine | 98.9 | 63.0 | 410 |
| T-C-G1 | C-G1 | GAA | 96.6 | 35.4 | 223 |
| T-C-G2 | C-G2 | GAA | 84.1 | 69.9 | 409 |
| T-G1 | G1 | GAA | 82.0 | 83.0 | 475 |
| T-G2 | G2 | GAA | 87.0 | 92.0 | 559 |
| T-C-MM1 | C-MM1 | met-met | 95.7 | 35.4 | 219 |
| T-C-MM2 | C-MM2 | met-met | 77.1 | 62.3 | 332 |
| T-C-MM3 | C-MM3 | met-met | 69.1 | 61.8 | 315 |
| T-MM1 | MM1 | met-met | 86.0 | 89.0 | 529 |
| T-MM2 | MM2 | met-met | 68.3 | 85.6 | 431 |
| T-MM3 | MM3 | met-met | 83.0 | 94.0 | 575 |

The invention claimed is:

1. A composition for feeding a ruminant, the composition comprising:
   a) a core comprising a biologically active ingredient selected from the group consisting of i) amino acids, derivatives of amino acids, and/or salts of amino acids and/or of their derivatives, ii) proteins, iii) peptides, iv) carbohydrates, v) vitamins, vitamin A, vitamin A acetate, vitamin A palmitate, vitamin B, thiamine, thiamine hydrochloride, riboflavin, nicotinic acid, nicotinic acid amide, calcium pantothenate, choline pantothenate, pyridoxine hydrochloride, cholin chloride, cyanocobalamine, biotin, folic acid, p-aminobenzoic acid, vitamin D2, vitamin D3, and vitamin E, vi) probiotic microorganisms, vii) prebiotic foods, viii) choline and salts and/or derivatives thereof, and ix) polyunsaturated fatty acids (PUFAs), and salts and/or derivatives thereof; and
   b) a coating surrounding said core,
   wherein said coating comprises one or more layers of a mixture comprising a saturated fat, and a fatty acid, and said coating comprises from 75 wt. % to 82 wt. % of the saturated fat and from 18 wt. % to 25 wt. % of the fatty acid, each based on a total weight of the coating, and wherein the composition comprises from 20 wt %+/−10% to 30 wt. %+/−10% of the coating, based on a total weight of the composition wherein the saturated fat is hydrogenated palm oil and the fatty acid is steric acid.

2. The composition of claim 1, wherein the coating comprises at least two layers, wherein each of the at least two layers has a different composition of the mixture.

3. The composition of claim 1, wherein a first layer surrounding the biologically active ingredient has a higher amount of the fatty acid than a second or any further layer surrounding the first or any preceding layer.

4. The composition of claim 1, wherein the coating comprises a first layer and a second layer, wherein the first layer comprises from 70 wt. %+/−10% to 80 wt. %+/−10% of the saturated fat and from 20 wt. %+/−10% to 30 wt. %+/−10% of the fatty acid, based on a weight of the first layer, and the second or any further layer comprises from 70 wt. %+/−10% to 99 wt. %−10% of the saturated fat and from 10 wt. %+/−10% to 25 wt. %+/−10% of the fatty acid, based on a weight of the second of any further layer.

5. The composition of claim 1, wherein a first layer surrounding the biologically active ingredient has a higher amount of the mixture than the second or any further layer surrounding the first or any preceding layer.

6. The composition of claim 1,
   wherein the composition consists of the core and the coating, and
   the coating consists of one layer of the mixture.

7. A composition for feeding a ruminant, comprising:
   a core comprising a biologically active ingredient selected from the group consisting of amino acids or salts thereof, proteins, peptides, carbohydrates, vitamins, probiotic microorganisms, prebiotic foods, choline, salts, and polyunsaturated fatty acids (PUFAs) or salts thereof, and
   a coating surrounding the core,
   wherein the coating comprises at least one layer of a mixture comprising 75 wt. % to 80 wt. % of a saturated fat and 20 wt. % to 25 wt. % of a fatty acid, based on a total weight of the coating, wherein the saturated fat is hydrogenated palm oil and the fatty acid is steric acid, and
   an amount of the coating is from 20 wt. % to 30 wt. % based on a total weight of the composition.

8. The composition of claim 7,
wherein the composition consists of the core and the coating, and
the coating consists of the layer of the mixture.

9. The composition of claim 7,
wherein the coating comprises at least two layers including a first layer surrounding and in contact with the core and a second layer surrounding the first layer,
the first layer and the second layer have different compositions of the mixture, and
the first layer consists of the saturated fat and the fatty acid.

10. The composition of claim 9, wherein the first layer has a higher amount of the fatty acid than the second layer.

11. A process for preparing the composition of claim 1, the process comprising:
a) providing particles comprising a biologically active ingredient selected from the group consisting of i) amino acids, derivatives of amino acids, and/or salts of amino acids and/or of their derivatives, ii) proteins, iii) peptides, iv) carbohydrates, v) vitamins, vitamin A, vitamin A acetate, vitamin A palmitate, vitamin B, thiamine, thiamine hydrochloride, riboflavin, nicotinic acid, nicotinic acid amide, calcium pantothenate, choline pantothenate, pyridoxine hydrochloride, cholin chloride, cyanocobalamine, biotin, folic acid, p-aminobenzoic acid, vitamin D2, vitamin D3, and vitamin E, vi) probiotic microorganisms, vii) prebiotic foods, viii) choline and salts and/or derivatives thereof, and ix) polyunsaturated fatty acids (PUFAs), and salts and/or derivatives thereof in a drum coater;
providing a mixture comprising from 75 wt. % to 82 wt. % of the saturated fat and from 18 wt. % to 25 wt. % of the fatty acid, each based on a total weight of the mixture, in a reservoir outside the drum coater, wherein the saturated fat is hydrogenated palm oil and the fatty acid is steric acid
c) heating the particles of a) to a temperature in a range of from 20° C. below a lower melting point of the mixture of b) to an upper melting point of the mixture of b);
d) heating the mixture of b) to a temperature in a range of from the upper melting point of the mixture of b) to 20° C. above the upper melting point of the mixture of b), to obtain a heated mixture;
e) applying the heated mixture of d) onto the particles of c) in a rotating drum coater, to obtain a bed of particles;
f) maintaining a temperature of the bed of particles obtained in e) at a temperature in a range of from 20° C. below the lower melting point of the mixture of b) to the lower melting point of the mixture of b), to obtain a composition; and
g) cooling the composition obtained from f) or allowing the composition obtained from f) to cool, to obtain a cooled composition,
wherein, when the composition to be prepared has two or more layers, c) to f) or c) to g) are repeated with the composition obtained from f) or the cooled composition obtained from g).

12. A method of supplementing a diet of a ruminant with a biologically active ingredient, the method comprising:
providing the ruminant with the composition of claim 1 and/or with a feed, feed material, premix or feed additive comprising the composition.

* * * * *